(12) United States Patent
Klinghult

(10) Patent No.: US 7,990,103 B2
(45) Date of Patent: Aug. 2, 2011

(54) PORTABLE ELECTRONIC APPARATUS, AND BATTERY CHARGING SYSTEM COMPRISING AN ANTENNA ARRANGEMENT FOR A RADIO RECEIVER

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 436 days.

(21) Appl. No.: 12/276,500

(22) Filed: Nov. 24, 2008

(65) Prior Publication Data

US 2010/0127659 A1     May 27, 2010

(51) Int. Cl.
*H02J 7/00* (2006.01)
(52) U.S. Cl. ....................................................... 320/108
(58) Field of Classification Search .................. 320/108; 343/850
See application file for complete search history.

(56) References Cited

U.S. PATENT DOCUMENTS

| | | | | |
|---|---|---|---|---|
| 2,092,709 | A * | 9/1937 | Wheeler | 343/730 |
| 2,606,964 | A * | 8/1952 | Gluyas, Jr. | 333/26 |
| 2,897,499 | A * | 7/1959 | Marshall et al. | 343/850 |
| 4,085,405 | A * | 4/1978 | Barlow | 343/858 |
| 5,198,825 | A * | 3/1993 | Sakurai et al. | 343/713 |
| 5,455,466 | A * | 10/1995 | Parks et al. | 307/104 |
| 5,519,386 | A * | 5/1996 | Tobergte | 340/10.34 |
| 5,859,873 | A * | 1/1999 | Ritter | 375/259 |
| 6,275,143 | B1 * | 8/2001 | Stobbe | 340/10.34 |
| 7,121,472 | B2 * | 10/2006 | Shimizu et al. | 235/492 |
| 7,348,931 | B2 * | 3/2008 | Suzuki et al. | 343/850 |
| 2005/0225484 | A1 * | 10/2005 | Kuramoto | 343/700 MS |
| 2006/0214857 | A1 * | 9/2006 | Ollikainen | 343/702 |
| 2010/0081378 | A1 * | 4/2010 | Kawamura | 455/41.1 |

FOREIGN PATENT DOCUMENTS

| WO | WO 2007/139582 A1 | 12/2007 |
|---|---|---|
| WO | WO 2008/072628 A1 | 6/2008 |

OTHER PUBLICATIONS

International Search Report, corresponding to PCT/EP2009/056327, mailed on Jan. 12, 2010.

(Continued)

*Primary Examiner* — Edward Tso
*Assistant Examiner* — Manuel Hernandez
(74) *Attorney, Agent, or Firm* — Renner, Otto, Boisselle & Sklar, LLP

(57) ABSTRACT

A charging system for a portable electronic device is disclosed. The system comprises a charging station providing a magnetic field for power distribution by an alternating current source connected to a power transmission coil for providing the magnetic field, and the portable electronic device. The portable electronic device comprises a radio receiver; a charging mechanism for charging a battery of the portable electronic device; and an antenna arrangement for the radio receiver, wherein the charging mechanism comprises a first coil arranged to interact with the power transmission coil of the charging station upon charging; a rectifier connected to the first coil to receive an alternating current therefrom and to a power supply output to provide a direct current, and the antenna arrangement comprises an antenna element comprising the first coil; a resonator tuned for a frequency band in which the radio receiver is intended to receive radio transmissions; a series resonance circuit comprising a capacitor and a second coil connected in series between one terminal of the first coil and a reference voltage of the portable apparatus.

22 Claims, 3 Drawing Sheets

OTHER PUBLICATIONS

Written Opinion, corresponding to PCT/EP2009/056327, mailed on Jan. 12, 2010.
Yat-Hei Lam et al: "Integrated Low-Loss CMOS Active Rectifier for Wirelessly Powered Devices" IEEE Transactions on Circuits and Systems II: Express Briefs, IEEE Service Center, New York, NY, US, vol. 53, No. 12, Dec. 1, 2006, pp. 1378-1382, XP011152142 ISSN: 1057-7130.

* cited by examiner

PORTABLE ELECTRONIC APPARATUS, AND BATTERY CHARGING SYSTEM COMPRISING AN ANTENNA ARRANGEMENT FOR A RADIO RECEIVER

TECHNICAL FIELD

The present invention relates to a portable electronic apparatus and a charging system for the portable apparatus. The present invention particularly relates to utilizing components used for charging also as an antenna for a radio receiver of the portable electronic apparatus.

BACKGROUND

Portable electronic devices room more and more features, while remaining small and portable. Processing means can gain more processing power and memory space in the same physical size as the technology evolves. However, some components are restricted in size due to their need to have a certain size to work. An example on this is antennas, where a certain wavelength requires a certain size of the antenna. It is therefore a desire to cope with constraints in size, both with regard to demands of function, and with regard to demands of portability.

SUMMARY

The present invention is based on the understanding that a radio receiver for Medium Frequency (MF) radio band requires a physically large, in terms of portable apparatuses, antenna for proper reception, and also on the understanding that charging using induction chargers, which use an induction coil to create an alternating magnetic field from a charging station, and then a second induction coil in the portable device takes power from the magnetic field and converts it back into electrical current to charge the battery, implies the need for a coil with non-negligible size in the portable electronic apparatus. The inventor has found that, by proper circuitry according to the invention, the same component, the coil, can be used as antenna as well as for the inductive charging.

According to a first aspect, there is provided a portable electronic device, comprising a radio receiver; a charging mechanism for charging a battery of the portable electronic device; and an antenna arrangement for the radio receiver. The charging mechanism comprises a first coil arranged to interact with a charging station providing a magnetic field for power distribution to the portable electronic device upon charging; and a rectifier connected to the first coil to receive an alternating current therefrom and to a power supply output to provide a direct current. The antenna arrangement comprises an antenna element comprising the first coil; a resonator tuned for a frequency band in which the receiver is intended to receive radio transmissions; and a first series resonance circuit comprising a capacitor and a second coil connected in series between one terminal of the first coil and a reference voltage of the portable apparatus.

The resonator may comprise the first coil and a capacitor connected in parallel therewith. The portable electronic device may further comprise a capacitor connected between another terminal of the first coil and the radio receiver.

The resonator may alternatively comprise a second series resonance circuit connected between the another terminal of the first coil and the radio receiver.

The portable electronic device may further comprise a third resonance circuit arranged between the another terminal of the first coil and the rectifier to provide a high impedance at frequencies for radio reception and a low impedance for a frequency of the magnetic field for power distribution to the portable electronic device. The third resonance circuit may comprise a capacitor and a coil connected in parallel and having a resonance frequency at frequencies for radio reception. The third resonance circuit may alternatively comprise a capacitor and a coil connected in series and having a resonance frequency at a frequency of the magnetic field for power distribution to the portable electronic device.

The power supply output may comprise a capacitor electrically connected across output terminals of the power supply output.

The radio receiver may be arranged to receive radio transmissions within the AM band, and the magnetic field for power distribution is provided in a frequency band different from the AM band. The magnetic field for power distribution may be provided in a frequency between 100 kHz and 400 kHz, preferably between 175 kHz and 300 kHz, preferably about 200 kHz. The magnetic field for power distribution may alternatively be provided in a frequency between 1800 kHz and 2400 kHz, preferably between 1900 kHz and 2200 kHz, preferably about 2000 kHz.

The first series resonance circuit may be tuned to provide a short circuit for a frequency band in which the receiver is intended to receive radio transmissions.

The reference voltage may be a ground reference of the portable electronic device.

According to a second aspect, there is provided a charging system for a portable electronic device. The system comprises a charging station providing a magnetic field for power distribution by an alternating current source connected to a power transmission coil for providing the magnetic field; and a portable electronic device. The portable electronic device comprises a radio receiver; a charging mechanism for charging a battery of the portable electronic device; and an antenna arrangement for the radio receiver. The charging mechanism comprises a first coil arranged to interact with the power transmission coil of the charging station upon charging; a rectifier connected to the first coil to receive an alternating current therefrom and to a power supply output to provide a direct current. The antenna arrangement comprises an antenna element comprising the first coil; a resonator tuned for a frequency band in which the receiver is intended to receive radio transmissions; and a first series resonance circuit comprising a capacitor and a second coil connected in series between one terminal of the first coil and a reference voltage of the portable apparatus.

The resonator may comprise the first coil and a capacitor connected in parallel therewith. The charging system may further comprise a capacitor connected between another terminal of the first coil and the radio receiver.

The resonator alternatively comprises a second series resonance circuit connected between the another terminal of the first coil and the radio receiver.

The charging system may further comprise a third resonance circuit arranged between the another terminal of the first coil and the rectifier to provide a high impedance at frequencies for radio reception and a low impedance for a frequency of the magnetic field for power distribution to the portable electronic device.

The third resonance circuit may comprise a capacitor and a coil connected in parallel and having a resonance frequency at frequencies for radio reception.

The third resonance circuit may comprises a capacitor and a coil connected in series and having a resonance frequency at a frequency of the magnetic field for power distribution to the portable electronic device.

The power supply output may comprise a capacitor electrically connected across output terminals of the power supply output.

The radio receiver may be arranged to receive radio transmissions within the AM band, and the magnetic field for power distribution may be provided by the charging station in a frequency band different from the AM band.

The magnetic field for power distribution may be provided by the charging station in a frequency between 100 kHz and 400 kHz, preferably between 175 kHz and 300 kHz, preferably about 200 kHz. The magnetic field for power distribution may alternatively be provided by the charging station in a frequency between 1800 kHz and 2400 kHz, preferably between 1900 kHz and 2200 kHz, preferably about 2000 kHz.

The first series resonance circuit may be tuned to provide a short circuit for a frequency band in which the receiver is intended to receive radio transmissions.

The reference voltage may be a ground reference of the portable electronic device.

DETAILED DESCRIPTION

Medium frequency (MF) radio band normally refers to radio frequencies (RF) in the range of 300 kHz to 3000 kHz. Medium Wave (MW) is a part of the MF radio band used mainly for amplitude modulated (AM) broadcasting, and is therefore here referred to at the "AM band". For most of the world the frequencies used for broadcasting in the AM band ranges from 515 kHz to 1629 kHz, and in North America an extended AM band ranges from 515 kHz to 1715 kHz. MW signals have the property of following the curvature of the earth at all times, and also refracting off the ionosphere at night. This makes this frequency band suitable for both local and continent-wide service. Provision of an antenna for these long wavelength signals in a portable device can be made by arranging a coil, preferably with a ferrite core, which arrangement works as a compact antenna.

Inductive charging charges electrical batteries using magnetic induction. The principle is that a charging station sends energy through inductive coupling to an electrical device, which stores the energy in its battery. The major advantage of the inductive approach over conductive charging is that there is no need for terminals for connection between the charger and the device, and further that exposure for electric discharge is reduced as there are no exposed conductors. This is particularly beneficial for devices arranged to be waterproof or suitable for use in harsh environments. Induction chargers use an induction coil to create an alternating magnetic field from the charging station, and then a second induction coil in the portable device takes power from the magnetic field and converts it back into electrical current to charge the battery. The two induction coils in proximity thus combine to form an electrical transformer.

Coils, in particular when they comprise a large number of windings and are suitable for higher currents, become both large and costly. The re-use of such a coil for dual purposes according to the present invention, as will be demonstrated for a number of embodiments with reference to the drawings, therefore provides advantages accordingly.

Figure 1:
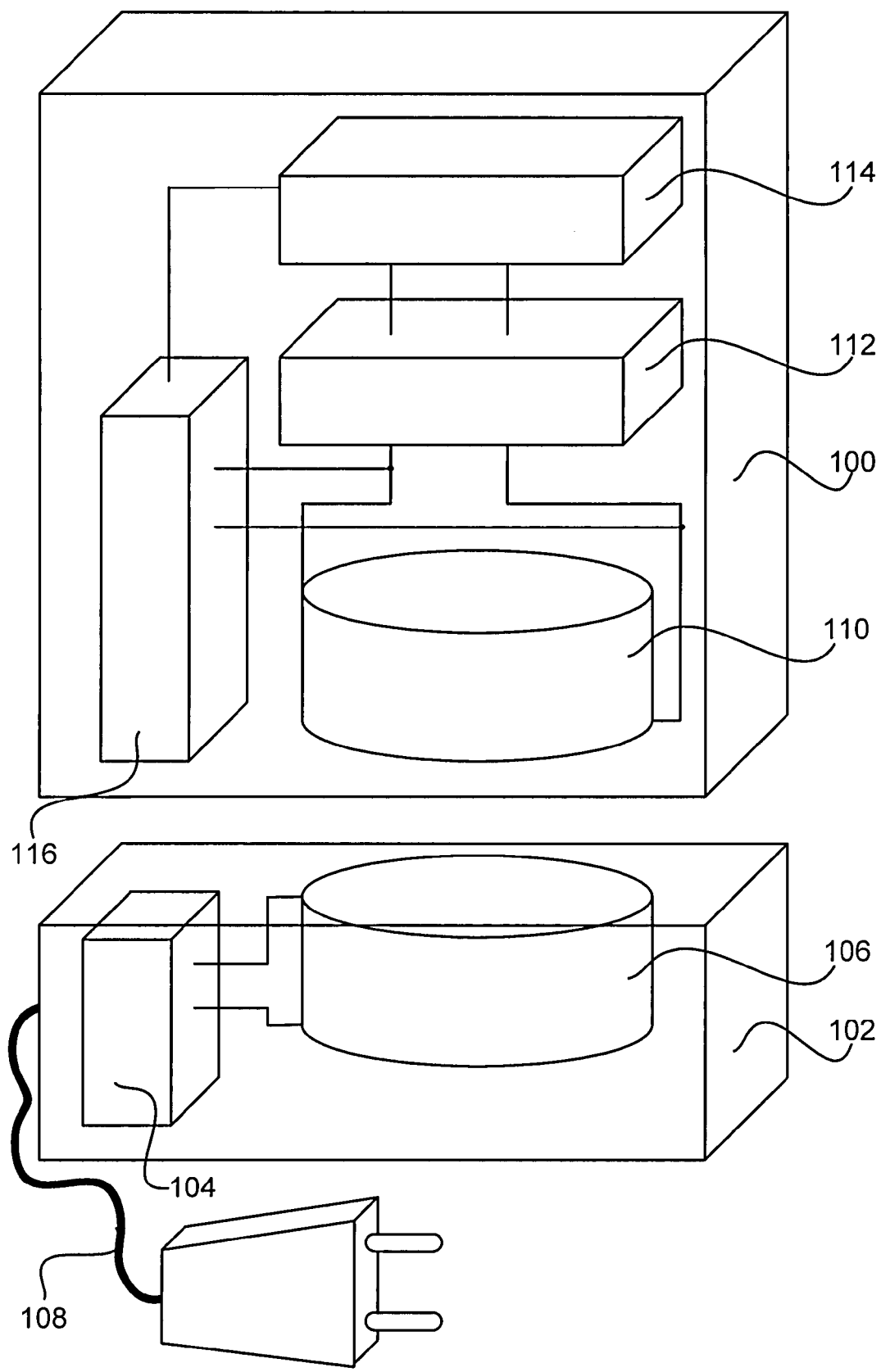
FIG. 1 schematically illustrates a portable electronic device and a charging station.

FIG. 1 schematically illustrates a portable electronic device 100 and a charging station 102. The charging station 102 is arranged to provide a magnetic field for power distribution by an alternating current source 104 connected to a power transmission coil 106 for providing the magnetic field. Thus, an alternating magnetic flux is generated by the coil. The current source 104 can for example get its power from a power distribution network via a wired connection 108.

The portable electronic device 100 comprises a first coil 110 which, when the portable electronic device 100 is put at the charging station 102, interacts inductively with the power transmission coil 106 such that the alternating magnetic flux induces an electrical field, and thus a voltage and current, in the first coil 110 according to the principles of a transformer. The harvested power in the first coil 110 is provided to a charging mechanism 112, which thus is able to charge a battery 114.

The portable electronic device 100 further comprises a radio receiver 116, which preferably is powered by the battery 114. The radio receiver 116 is connected to an antenna, which is formed by the first coil 110. The radio receiver can be arranged to receive radio transmissions on the AM band. The charging station preferably provides the alternating magnetic flux in a different frequency band than the AM band. This both provides for ability to use the radio receiver during charging, and for the ability to provide filters for avoiding the relatively high power of the "transformer" to reach the radio receiver circuitry. As elucidated above, the AM band reaches from about 500 to 1700 kHz, while the alternating flux can be selected to be either below or above the AM band in frequency. For example, when considering the range below the AM band, the alternating flux can be in the range between 100 kHz and 400 kHz. The efficiency of the transformer depend on ability to physically arrange the power transmission coil 106 and the first coil 110, but for straightforward consumer adapted products, it has been found that frequencies between 175 and 300 kHz give a fair efficiency. In a particular test setup, the efficiency proved to be excellent in a range between 175 and 200 kHz, where a frequency of about 200 kHz was found to be preferred. When considering the range above the AM band, frequencies between 1800 and 2400 kHz were found feasible, while frequencies around 2000 kHz worked well without any unwanted effects down in the AM band. With a fair tuning of filters, believed suitable for production of consumer products, frequencies between 1900 and 2200 kHz were found to work properly.

Figures 2A, 2B, 2C:
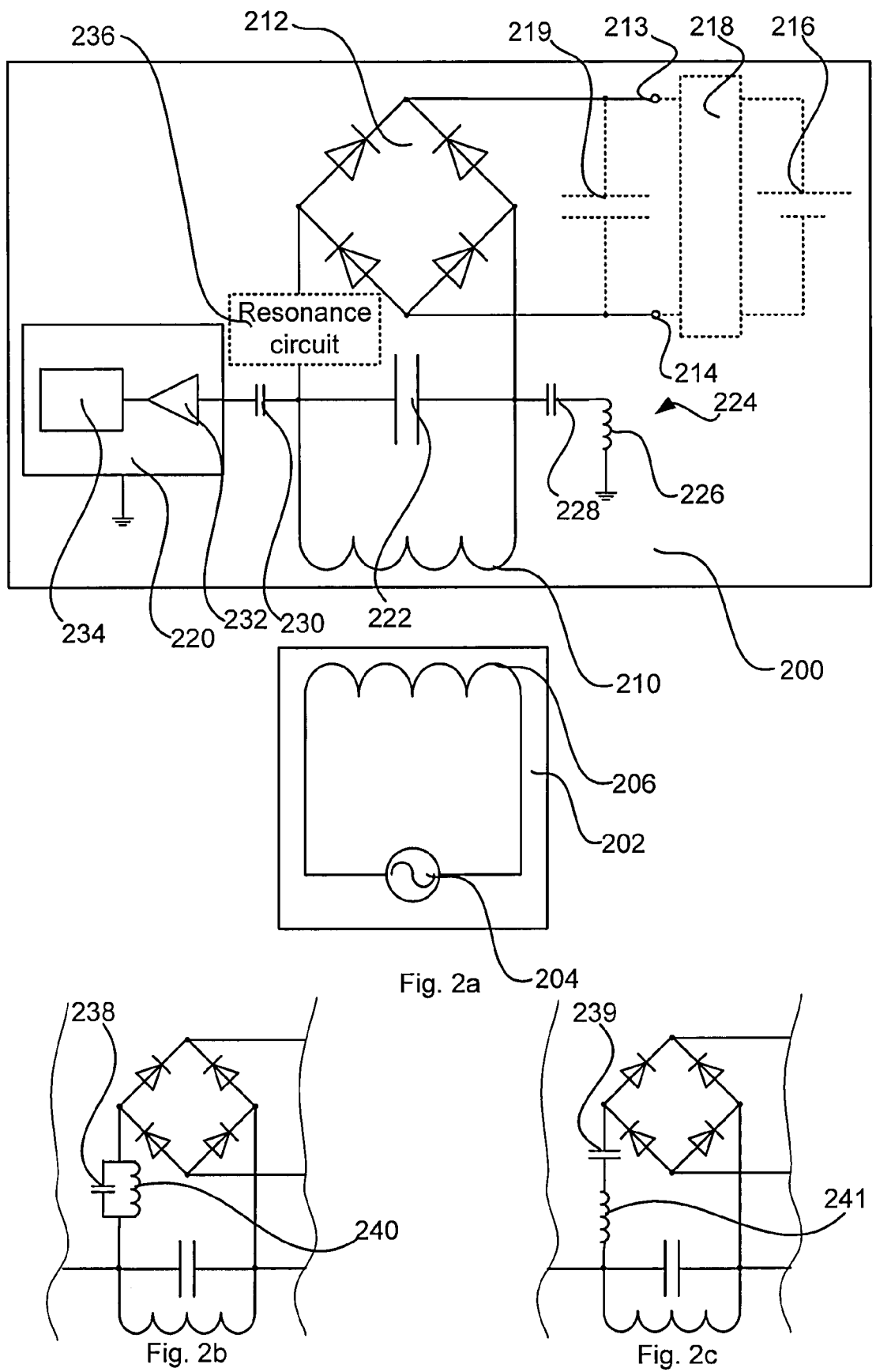
FIG. 2 is a schematic circuit diagram illustrating circuitry of a portable device and a charging station according to an embodiment.

FIG. 2a is a schematic circuit diagram illustrating circuitry of a portable device 200 and a charging station 202, and FIGS. 2b and 2c illustrate relevant parts for variants with an optional resonance circuit 236. The charging station 202 is arranged to provide a magnetic field for power distribution by an alternating current source 204 connected to a power transmission coil 206 for providing the magnetic field. Thus, an alternating magnetic flux is generated by the coil.

The portable electronic device 200 comprises a first coil 210 which, when the portable electronic device 200 is arranged with the charging station 202 for charging, interacts inductively with the power transmission coil 206 such that the alternating magnetic flux induces an electrical field, and thus a voltage and current, in the first coil 210 according to the principles of a transformer. The harvested power in the first coil 210 is provided to a rectifier 212 which provides a rectified, and thus direct current (DC), voltage to output terminals 213, 214. The power provided on the output terminals 213, 214 is used for charging a battery 216, e.g. via a charging regulator 218. Optionally, a smoothening capacitor 219 is provided across the output terminals 213, 214 to provide a smoother DC level.

The portable electronic device 200 further comprises a radio receiver 220 and an antenna for the radio receiver 220. The antenna is formed by the first coil 210, which is connected in parallel with a first capacitor 222 such that the first coil 210 and the first capacitor form a parallel resonator for the radio band to be received. A series resonance circuit 224 comprising a second coil 226 and a second capacitor 228 is connected between one terminal of the first coil and a reference voltage, e.g. ground, of the portable electronic device 200. The series resonance circuit 224 is preferably arranged to form a short circuit to the reference voltage for frequencies for the radio band to be received. The other terminal of the first coil 210 is connected to the radio receiver 220 via a third capacitor 230. To provide a proper impedance in radio frequency for the antenna, a resonance circuit 236 can be arranged between the rectifier 212 and the connection to the radio receiver 220 and first coil 210, through which the frequency of the charging experiences a low impedance, while the radio frequencies intended for the radio receiver 220 experience a high impedance. Thereby, a proper Q-value for the resonator 210, 222 is maintained. The resonator 236 can comprise a capacitor 238 and a coil 240 connected in parallel, and be arranged to resonate at frequencies of the radio band to be received, as illustrated in FIG. 2b. Alternatively, the resonator 236 can comprise a capacitor 239 and a coil 241 connected in series, as illustrated in FIG. 2c, and be arranged to resonate at a frequency of the alternating magnetic flux. The radio receiver 220 preferably comprises an amplifier 232 arranged to amplify the signal from the antenna 210. Preferably, the radio receiver 220, i.e. the amplifier, has high impedance not to load the resonant circuit 210, 222. The amplified signal is provided to a demodulator 234 arranged to demodulate the received radio signal to provide the received information, e.g. to a speaker or to further signal processing.

Figure 3A:
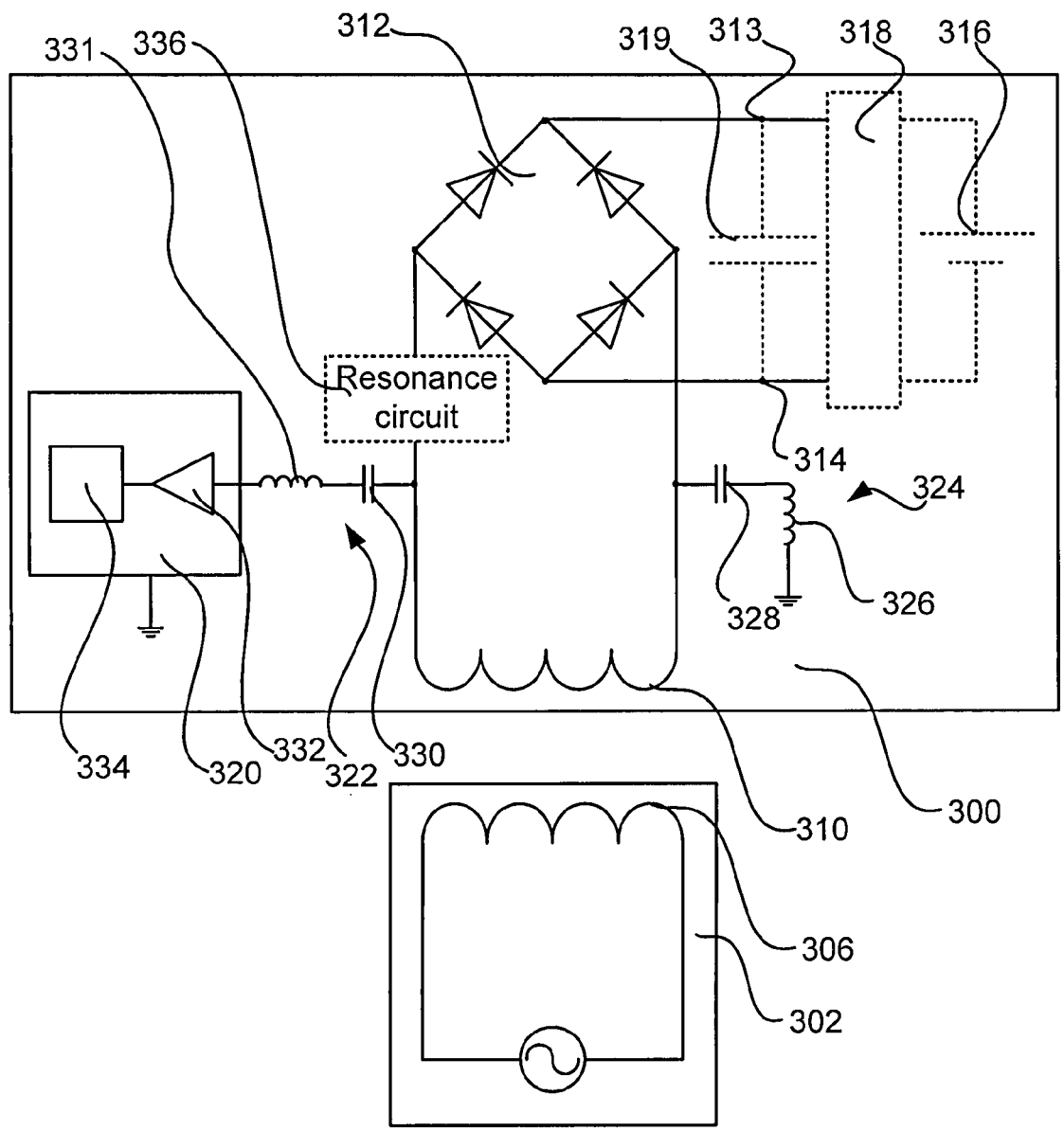
FIG. 3 is a schematic circuit diagram illustrating circuitry of a portable device and a charging station according to an embodiment.

FIG. 3 is a schematic circuit diagram illustrating circuitry of a portable device 300 and a charging station 302. The charging station 302 is arranged similar to what has been demonstrated with reference to FIG. 2.

The portable electronic device 300 comprises a first coil 310 which, when the portable electronic device 300 is arranged with the charging station 302 for charging, interacts inductively with the power transmission coil 306 similar to what has been demonstrated with reference to FIG. 2. The harvested power in the first coil 310 is provided to a rectifier 312 which provides a rectified, and thus direct current (DC), voltage to output terminals 313, 314. The power provided on the output terminals 313, 314 is used for charging a battery 316, e.g. via a charging regulator 318. Optionally, a smoothening capacitor 319 is provided across the output terminals 313, 314 to provide a smoother DC level.

Figure 3B:
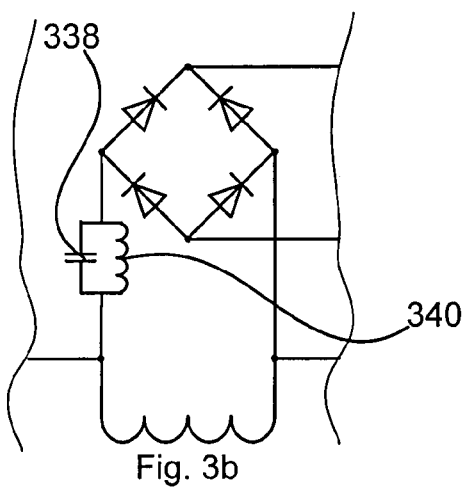
Figure 3C:
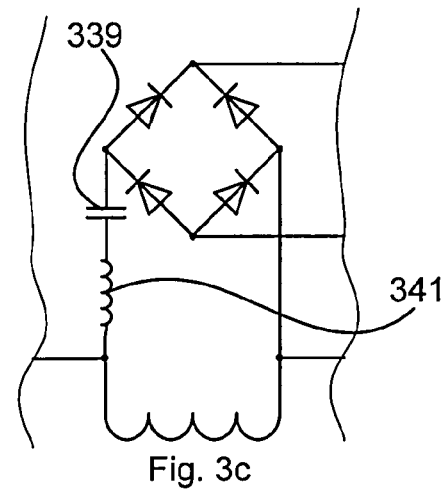

The portable electronic device 300 further comprises a radio receiver 320 and an antenna for the radio receiver 320. The antenna is formed by the first coil 310, which is connected in to the radio receiver 320 via a first series resonator 322 arranged to provide the frequencies for radio reception to the receiver 320. The first series resonator 322 can comprise a capacitor 330 and a coil 331 connected in series. Further, a second series resonance circuit 324 is connected between one terminal of the first coil and a reference voltage, e.g. ground, of the portable electronic device 300. The series resonance circuit 324 can comprise a coil 326 and a capacitor 328 connected in series, and is preferably arranged to form a short circuit to the reference voltage for frequencies for the radio band to be received. To provide a proper impedance in radio frequency for the antenna, a resonator 336 can be arranged between the rectifier 312 and the connection to the first series resonator 322 and first coil 310, through which the frequency of the charging experiences a low impedance, while the radio frequencies intended for the radio receiver 320 experience a high impedance. Thereby, a proper Q-value for the resonator 322 is maintained. The resonator 336 can comprise a capacitor 338 and a coil 340 connected in parallel, and be arranged to resonate at frequencies of the radio band to be received, as illustrated in FIG. 3b. Alternatively, the resonator 336 can comprise a capacitor 339 and a coil 341 connected in series, as illustrated in FIG. 3c, and be arranged to resonate at a frequency of the alternating magnetic flux. The radio receiver 320 preferably comprises an amplifier 332 arranged to amplify the signal from the antenna 310. Preferably, the radio receiver 320, i.e. the amplifier, has high impedance not to load the resonant circuit 322. The amplified signal is provided to a demodulator 334 arranged to demodulate the received radio signal to provide the received information, e.g. to a speaker or to further signal processing.

The portable electronic device according to any of the demonstrated embodiments can for example be a mobile phone, a media player, a portable game console, a personal digital assistant, a digital camera, etc. In any of these, the feature of receiving MW band broadcasting can be a desired feature, as well as inductive charging. For any of these applications, the cost and space saving solution according to the invention is particularly advantageous.

The invention claimed is:

1. A portable electronic device, comprising
a radio receiver;
a charging mechanism for charging a battery of the portable electronic device; and
an antenna arrangement for the radio receiver,
wherein the charging mechanism comprises
a first coil arranged to interact with a charging station providing a magnetic field for power distribution to the portable electronic device upon charging;
a rectifier connected to the first coil to receive an alternating current therefrom and to a power supply output to provide a direct current,
and the antenna arrangement comprises
an antenna element comprising the first coil;
a resonator tuned for a frequency band in which the receiver is intended to receive radio transmissions; and
a first series resonance circuit comprising a capacitor and a second coil connected in series between a first terminal of the first coil and a reference voltage of the portable apparatus,
wherein the resonator comprises a second series resonance circuit connected between a second terminal of the first coil and the radio receiver, and
further comprising a third resonance circuit arranged between the second terminal of the first coil and the rectifier to provide a high impedance at frequencies for radio reception and a low impedance for a frequency of the magnetic field for power distribution to the portable electronic device.

2. The portable electronic device according to claim 1, wherein the resonator comprises the first coil and a capacitor connected in parallel therewith.

3. The portable electronic device according to claim 2, further comprising a capacitor connected between the second terminal of the first coil and the radio receiver.

4. The portable electronic device according to claim 1, wherein the third resonance circuit comprises a capacitor and a coil connected in parallel and having a resonance frequency at frequencies for radio reception.

5. The portable electronic device according to claim 1, wherein the third resonance circuit comprises a capacitor and a coil connected in series and having a resonance frequency at a frequency of the magnetic field for power distribution to the portable electronic device.

6. The portable electronic device according to claim 1, wherein the power supply output comprises a capacitor electrically connected across output terminals of the power supply output.

7. The portable electronic device according to claim 1, wherein the radio receiver is arranged to receive radio transmissions within the AM band, and the magnetic field for power distribution is provided in a frequency band different from the AM band.

8. The portable electronic device according to claim 7, wherein the magnetic field for power distribution is provided in a frequency between 100 kHz and 400 kHz, preferably between 175 kHz and 300 kHz, preferably about 200 kHz.

9. The portable electronic device according to claim 7, wherein the magnetic field for power distribution is provided in a frequency between 1800 kHz and 2400 kHz, preferably between 1900 kHz and 2200 kHz, preferably about 2000 kHz.

10. The portable electronic device according to claim 1, wherein the first series resonance circuit is tuned to provide a short circuit for a frequency band in which the receiver is intended to receive radio transmissions.

11. The portable electronic device according to claim 1, wherein the reference voltage is a ground reference of the portable electronic device.

12. A charging system for a portable electronic device comprising
a charging station providing a magnetic field for power distribution by an alternating current source connected to a power transmission coil for providing the magnetic field; and
a portable electronic device, comprising a radio receiver; a charging mechanism for charging a battery of the portable electronic device; and an antenna arrangement for the radio receiver, wherein the charging mechanism comprises a first coil arranged to interact with the power transmission coil of the charging station upon charging; a rectifier connected to the first coil to receive an alternating current therefrom and to a power supply output to provide a direct current, and the antenna arrangement comprises an antenna element comprising the first coil; a resonator tuned for a frequency band in which the receiver is intended to receive radio transmissions; and a first series resonance circuit comprising a capacitor and a second coil connected in series between a first terminal of the first coil and a reference voltage of the portable apparatus,
wherein the resonator comprises a second series resonance circuit connected between a second terminal of the first coil and the radio receiver, and
further comprising a third resonance circuit arranged between the second terminal of the first coil and the rectifier to provide a high impedance at frequencies for radio reception and a low impedance for a frequency of the magnetic field for power distribution to the portable electronic device.

13. The charging system according to claim 12, wherein the resonator comprises the first coil and a capacitor connected in parallel therewith.

14. The charging system according to claim 13, further comprising a capacitor connected between a second terminal of the first coil and the radio receiver.

15. The charging system according to claim 12, wherein the third resonance circuit comprises a capacitor and a coil connected in parallel and having a resonance frequency at frequencies for radio reception.

16. The charging system according to claim 12, wherein the third resonance circuit comprises a capacitor and a coil connected in series and having a resonance frequency at a frequency of the magnetic field for power distribution to the portable electronic device.

17. The charging system according to claim 12, wherein the power supply output comprises a capacitor electrically connected across output terminals of the power supply output.

18. The charging system according to claim 12, wherein the radio receiver is arranged to receive radio transmissions within the AM band, and the magnetic field for power distribution is provided by the charging station in a frequency band different from the AM band.

19. The charging system according to claim 18, wherein the magnetic field for power distribution is provided by the charging station in a frequency between 100 kHz and 400 kHz, preferably between 175 kHz and 300 kHz, preferably about 200 kHz.

20. The charging system according to claim 18, wherein the magnetic field for power distribution is provided by the charging station in a frequency between 1800 kHz and 2400 kHz, preferably between 1900 kHz and 2200 kHz, preferably about 2000 kHz.

21. The charging system according to claim 12, wherein the first series resonance circuit is tuned to provide a short circuit for a frequency band in which the receiver is intended to receive radio transmissions.

22. The charging system according to claim 12, wherein the reference voltage is a ground reference of the portable electronic device.

* * * * *